(12) United States Patent
Maslowski

(10) Patent No.: US 11,646,636 B2
(45) Date of Patent: *May 9, 2023

(54) ELECTRICAL POWER SYSTEM

(71) Applicant: John Maslowski, Billerica, MA (US)

(72) Inventor: John Maslowski, Billerica, MA (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/206,602

(22) Filed: Mar. 19, 2021

(65) Prior Publication Data

US 2021/0211017 A1 Jul. 8, 2021

Related U.S. Application Data

(63) Continuation of application No. 16/151,890, filed on Oct. 4, 2018, now Pat. No. 10,985,632.

(51) Int. Cl.
| | |
|---|---|
| *H02K 7/18* | (2006.01) |
| *H02J 7/14* | (2006.01) |
| *H02K 7/00* | (2006.01) |

(52) U.S. Cl.
CPC .......... *H02K 7/1807* (2013.01); *H02J 7/1423* (2013.01); *H02K 7/003* (2013.01); *H02J 7/143* (2020.01)

(58) Field of Classification Search
CPC ...... H02K 7/1807; H02K 7/003; H02K 53/00; H02J 7/1423; H02J 7/143; H02J 7/1415
USPC .................................................. 310/68 r, 113
See application file for complete search history.

(56) References Cited

U.S. PATENT DOCUMENTS

| | | | |
|---|---|---|---|
| 4,424,464 A | 1/1984 | Ikegami | |
| 4,459,536 A | 7/1984 | Wirtz | |
| 4,827,393 A | 5/1989 | Clark | |
| 4,862,009 A | 8/1989 | King | |
| 4,958,119 A | 9/1990 | Fitzner | |
| 5,537,025 A | 7/1996 | Kern et al. | |
| 6,002,219 A | 12/1999 | Permuy | |
| 6,605,928 B2 | 8/2003 | Gupta et al. | |
| 8,314,578 B2 | 11/2012 | Namudur et al. | |
| 9,577,500 B2 | 2/2017 | Jones | |
| 10,985,632 B2* | 4/2021 | Maslowski | H02K 7/003 |
| 2010/0013335 A1 | 1/2010 | Strube | |
| 2010/0102568 A1 | 4/2010 | Bonin | |
| 2011/0210632 A1* | 9/2011 | Ding | H02K 53/00 310/113 |
| 2012/0262018 A1 | 10/2012 | Thiara | |
| 2014/0049128 A1 | 2/2014 | Zang | |
| 2014/0159845 A1 | 6/2014 | Barbat | |

FOREIGN PATENT DOCUMENTS

| | | |
|---|---|---|
| EP | 2 146 422 A1 | 1/2010 |
| WO | 2010079507 | 7/2010 |

* cited by examiner

*Primary Examiner* — Jeremy A Luks
(74) *Attorney, Agent, or Firm* — Lambert Shortell & Connaughton; David J. Connaughton, Jr.; Justin P. Tinger

(57) ABSTRACT

An electrical power system is provided. The electrical power system involves a battery powered motor which in turn generates electricity using a primary generator and a secondary generator. The secondary generator provides a recycle electricity to the battery, while the primary generator provides an electrical output for powering electrical devices.

19 Claims, 3 Drawing Sheets

ELECTRICAL POWER SYSTEM

BACKGROUND OF THE INVENTION

Field of the Invention

The present invention relates generally to electrical power systems. More particularly the present invention relates to a device to efficiently generate electricity to power electrical devices.

Description of Related Art

Electric usage is a vital aspect of modern life. While electricity typically reliably comes from an electrical utility, this is not always the case, such as at remote locations or in the event of a power outage. Many portable electrical generators utilize gasoline, propane, or other fossil fuel as an energy source. These small scale generators are not particularly efficient, emit noxious fumes and so cannot be used indoors, are very loud, and lead to increased greenhouse gas emissions.

Therefore, what is needed is a device that may efficiently provide electricity, in a wall outlet format (120 and/or 240 AC) for usage by electrical appliances and devices.

SUMMARY OF THE INVENTION

The subject matter of this application may involve, in some cases, interrelated products, alternative solutions to a particular problem, and/or a plurality of different uses of a single system or article.

In one aspect, an electrical power system is provided. The electrical power system has a battery, and a motor electrically connected to the battery. A linear shaft extends from the motor and is rotatable about a lengthwise axis by the motor. The shaft extends to a primary generator and engages, along its length, with a component, such as a rotor, of the primary generator. The primary generator defines a central opening which the shaft passes through. The shaft then extends to a secondary generator at its distal end. The shaft engage with a component, such as a rotor of the secondary generator. The electricity generated by the secondary generator (the "electrical output") is directed to and connected to the battery. The motor, primary generator, and secondary generator are aligned along the linear length of the shaft to engage with the linear shaft.

In another aspect, a method of generating power is provided. The method involves activating a motor which is powered by a battery in electrical communication with the motor. The activation of the motor causes rotation of a linear shaft extending outwardly from the motor. The shaft is engaged with a component of a primary generator which is rotated when the shaft rotates, as the linear shaft is engaged with the primary generator component. The same rotation of the shaft causes the rotating of a component of a secondary generator, the distal end of the shaft being engaged with the component of the secondary generator. The method further involves directing an electrical output from the secondary generator to the battery, and directing an electrical output from the primary generator to an electrical outlet panel.

DETAILED DESCRIPTION

Figure 1:
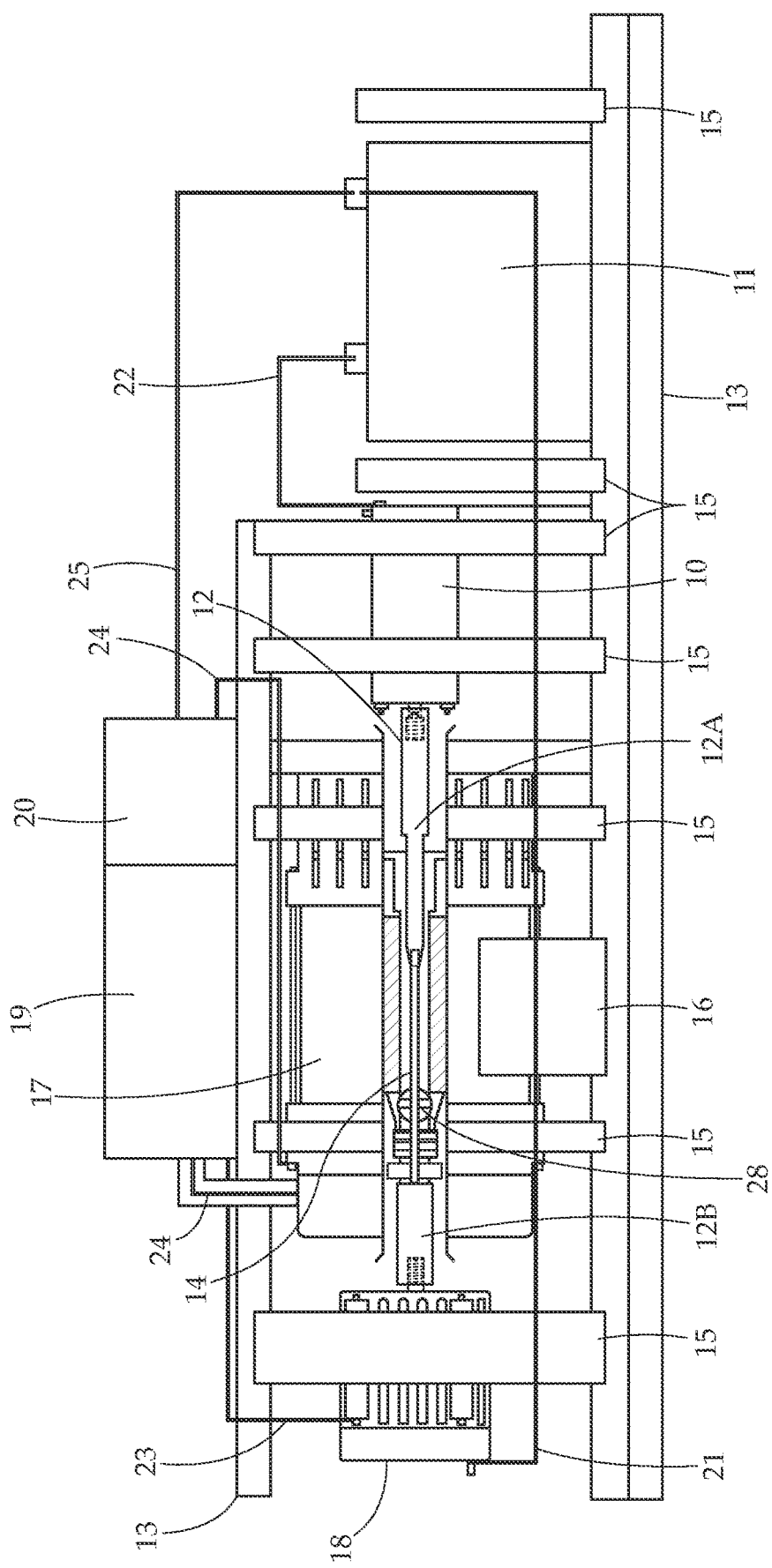
FIG. 1 provides a side view of an embodiment of the present disclosure.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an electrical power generator system. The system includes a battery as an energy source, a motor, a primary electrical generator and a secondary electrical generator. A shaft provides communication between the motor, primary electrical generator, and secondary electrical generator.

The battery is electrically connected to the motor. The motor may be any type of electrical motor. In a particular embodiment, the motor may be a permanent magnet motor. In most embodiments, the motor, when activate, rotates a motor output shaft.

The primary generator may be any device capable of generating electricity based on mechanical energy from a shaft rotated by the motor. For example, in one embodiment, the primary generator may be an AC alternator. In another embodiment, the primary generator may be a DC generator. In a particular embodiment, the primary generator may be a 5500 watt AC alternator. An electrical output of the primary generator is directed to power an electrical panel of power outlets through wiring such as a wiring harness. In various embodiments, electrical output of the primary generator may be alternatively or additionally directed to the battery and/or motor through a controller such as a switch or plurality of switches.

In the present inventive system, the shaft may pass or otherwise connect through a central cavity of the primary generator, and this same shaft may connect or otherwise engage with a secondary generator, such that the rotation of the single shaft engages components of both the primary and secondary generators. Engagement of the shaft with the primary and secondary generators may be achieved in any manner capable of moving operational components of the primary and secondary generators. The secondary generator may be any device capable of generating electricity based on mechanical energy from a shaft rotated by the motor. For example, in one embodiment, the secondary generator may be an AC alternator. In another embodiment, the secondary generator may be a DC generator. In most embodiments, electrical output of the secondary generator may be directed to recycle power to the battery. In various embodiments, electrical output of the secondary generator may be alternatively or additionally directed to the electrical panel and/or motor through a controller such as a programmed computer, switch, or plurality of switches. If needed, an AC/DC converter may be along an electrical path between secondary generator and the panel and/or or motor to convert power as needed.

The shaft contemplated herein is designed as a linear (straight) shaft which extends from the motor connection at a proximal end. The shaft is sized to pass through a central aperture of the primary generator, engaging with its operational components. The shaft then continues on, extending to the secondary generator to engage with its operational components. The shaft may be unitary or multi-piece. The shaft, in many embodiments, is formed of a conductive material, allowing, in certain embodiments, the negative terminal of the battery to be electrically connected to the motor body, which in turn allows current to flow through the shaft, to the secondary generator, and through wiring back to the battery to complete the circuit. In another similar embodiment, the negative terminal of the battery may be connected to the motor input, while the positive of the battery may be connected to the chassis of the secondary generator. In certain instances this may provide more efficient operation and generation of less heat than other connection arrangements. This is not required in all embodiments however. In other embodiments, the shaft may be made of any material, including a non-conductive material.

The components of the present system may be arranged in place on a stand. Typically the stand is made of wood, plastic, or some other non-conductive and durable material capable of tightly holding the various components in place, minimizing vibration and movement. The non-conductive nature of the stand prevents electrical flow other than on the intended paths. Further, the stand maintains the motor, primary generator, and secondary generator, in linear alignment with the shaft.

In one embodiment, a cover may enclose the components of the present invention. The cover may be formed of a material which blocks and/or reflects electromagnetic radiation, such as a metal, thereby limiting the amount of energy which leaves the system.

Turning now to FIG. 1, a side view of an embodiment of the present system is provided. A battery 11 provides at least the initial startup energy to run the system. The battery 11 is connected to power the motor 10 which, in this embodiment, is a permanent magnet motor. The motor 10 has an output shaft which rotates. Connected to the motor output is shaft 12, which connects to the motor at proximal end 12a. Upon activation of motor 10, shaft 12 rotates with respect to the primary generator, which in this embodiment is an AC alternator 17. The shaft 12 is engaged with the components (typically a rotor) of the alternator 17 to convert the rotational energy from the shaft into electrical energy. The alternator 17 defines a central opening 14 through which the shaft 12 passes. In this view, shaft 12 is engaged with a rotor 28 of the AC generator 17. At distal end 12b, the shaft 12 connects to the secondary generator 18, shown here as a DC generator 18. The battery 11, motor 10, primary generator 17, and secondary generator 18 are held in linear alignment by base 13, and its corresponding supports 15, 16, allowing the linear shaft 12 to engage with all of these elements.

An electricity output generated by the AC alternator 17 powers an AC outlet panel 19 via wiring harness 24 allowing connection and powering of electrical devices to the outlet panel. Switch 20 can operate to control electrical flow direction for excess electrical flow not used by the AC outlet panel and/or recycle electricity generated by the DC generator 18 as discussed below. The switch 20 may be operated by a controller such as a programmed computer, manual switch, or plurality of switches, automated switch/switches, and the like. If needed, an AC/DC converter may be along an electrical path from primary generator 17 to various components to convert power as needed.

An electricity output generated by the DC generator 18 is, in this embodiment, recycled back to the battery 11 to optimize energy efficiency via path 21. As shown in this embodiment, the negative connection 22 of battery is connected to the motor 10. To complete the circuit, electricity flows through the conductive shaft 12 to the conductive chassis of the DC alternator 18, and back to the battery via path 23 and 25.

Figure 2:
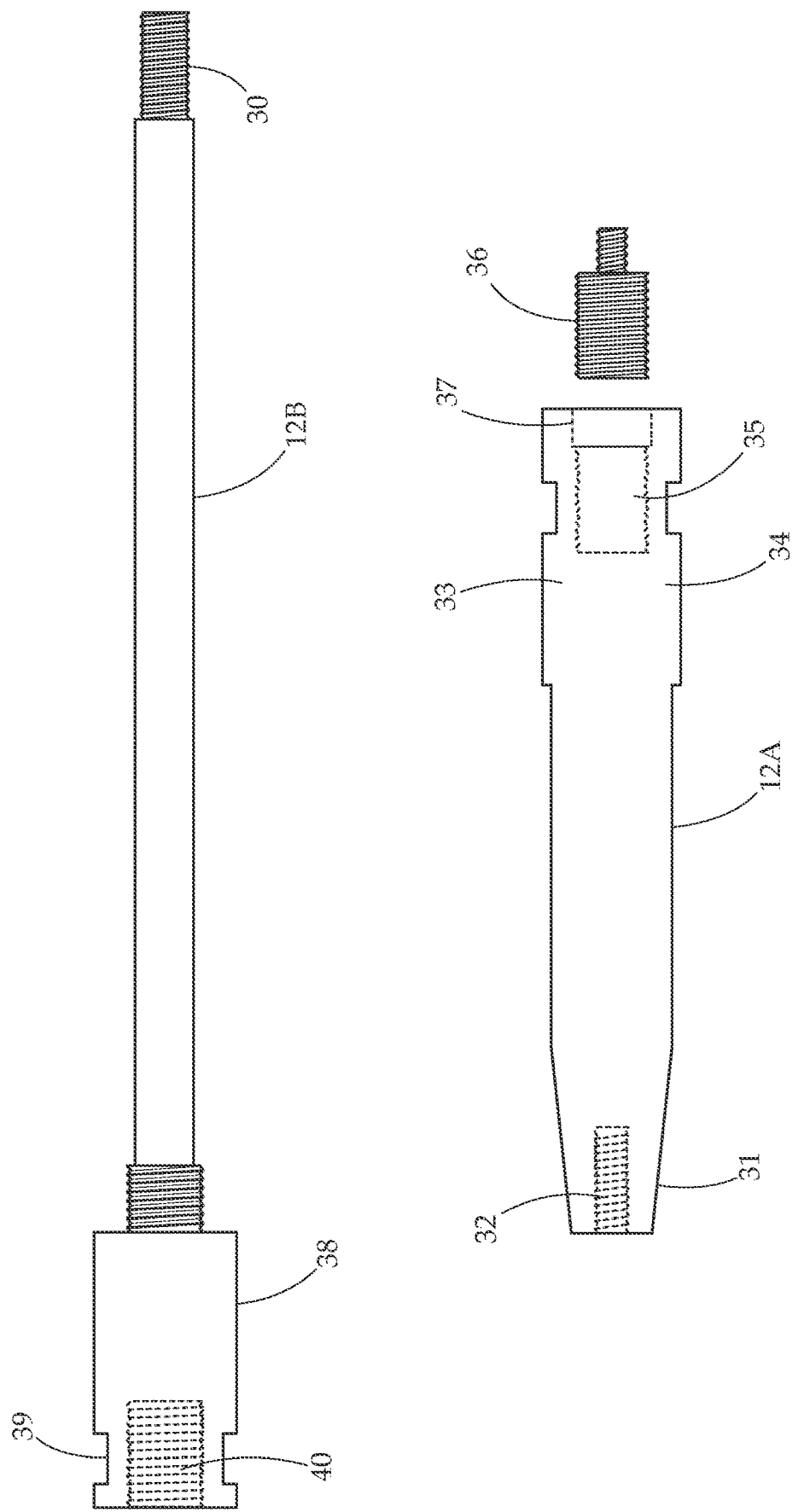
FIG. 2 provides an exploded view of an embodiment of the shaft of the present disclosure.

FIG. 2 shows an embodiment of the shaft of the present invention. The shaft is formed of two portions, the proximal end 12a and the distal end 12b. These portions are threadedly connected and detachable, as shown in this figure. The proximal end 12a has a tapered front 31 with threads 32 allowing connection of distal end 12b. The shaft 12a defines a threaded opening 35 which can receive a threaded rod 36 which may be part of, or connectable to, the motor. A notch 33 allows wrench access at the largest diameter region 34. The distal end of the shaft 12b has a threaded portion 37 to connect to threads 32. At the opposite end, which connects to the secondary generator 18, a large diameter portion 38 extends outwardly from the lengthwise axis of the shaft distal end 12b. This portion defines a notch 39 for a wrench, as well as a threaded region 40 for connection to the secondary generator 18. In other embodiments, shaft 12 may be a unitary piece.

Figure 3:
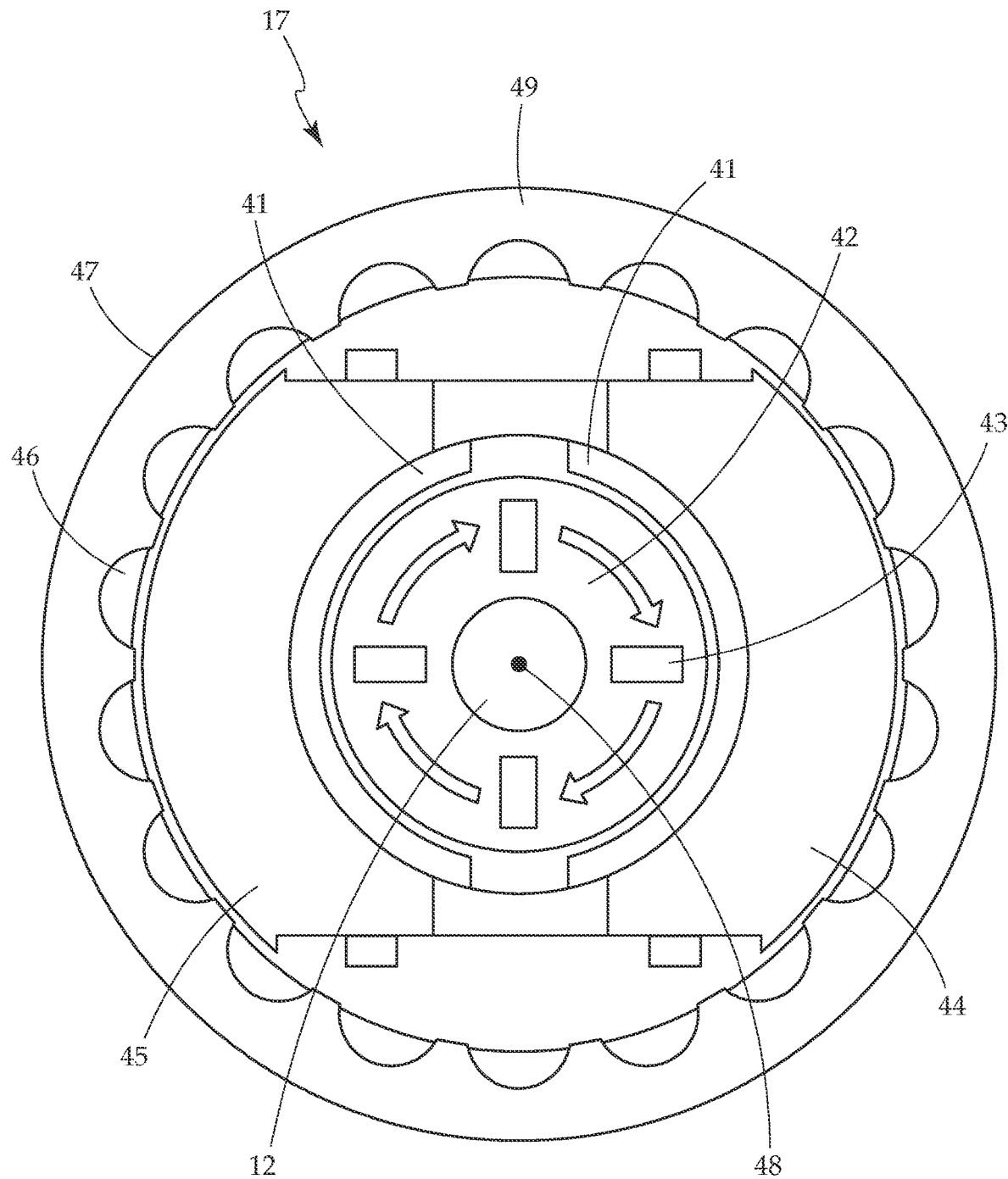
FIG. 3 provides a cross sectional view of an embodiment of the AC alternator and shaft of the present disclosure.

FIG. 3 provides a cross sectional view of the primary generator 17. The shaft 12 passes through the generator 17, shown here as an AC alternator. The shaft 12 engages with the armature 42 to rotate it, generating electricity. In the embodiment shown, a potential difference is created between the stator 47 and shaft 12. The armature 42 has magnets 41, brushes 43 connected thereto, as well as coils 44, 45. Stator 47 includes windings 46 in which the alternating voltage is generated.

The present invention may be used in various modes to generate electrical power for an electrical device. Generally, the battery may be used to start up the system at least initially, which then generates electricity. In certain highly efficient embodiments, the system may be self-sustaining or nearly self-sustaining. In other embodiments, the battery may power the motor until the battery dies, at which point it can be replaced with another charged battery, with the system operating as an electrical generator which is highly efficient and which does not require fossil fuels. Such an embodiment allows for indoor use which may be particularly advantageous for those living in high density areas who do not have outdoor space to run a conventional generator. Due to the recycle feed, the present generator is notably more efficient when compared to the prior art fossil fuel generators.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A electrical power system comprising:
   a battery;
   a motor, the battery connected to the motor;
   a linear shaft extending from the motor, the linear shaft being formed of a conductive material;
   a primary generator, the shaft extending through an aperture of the primary generator;
   a secondary generator on an opposite side of the primary generator from the motor, the shaft connecting to the secondary generator; and
   wherein one of a negative terminal or a positive terminal of the battery is electrically connected to the motor, and wherein the other of the negative terminal or the positive terminal of the battery is electrically connected to a chassis of the secondary generator, such that an electrical flow path travels through the shaft, to the chassis, and back to the battery to complete one circuit from the battery.

2. The electrical power system of claim 1 wherein the battery is connected to the motor to provide electrical power to the motor.

3. The electrical power system of claim 1 wherein the aperture is a central aperture.

4. The electrical power system of claim 1 wherein a distal end of the shaft connects to the secondary generator.

5. The electrical power system of claim 1 wherein the shaft engages with a component of the primary generator.

6. The electrical power system of claim 1 wherein the shaft engages with a component of the secondary generator.

7. The electrical power system of claim 1 wherein the shaft engages with a component of the primary generator and a component of the secondary generator.

8. The electrical power system of claim 1 wherein an electrical output from the secondary generator electrically connects to the battery.

9. The electrical power system of claim 1 wherein the motor, primary generator, and secondary generator are aligned along the linear length of the shaft.

10. The electrical power system of claim 9 wherein the motor, primary generator, and secondary generator are aligned along the linear length of the shaft to engage with the shaft.

11. The electrical power system of claim 1 wherein the primary generator is an AC alternator.

12. The electrical power system of claim 1 wherein the secondary generator is a DC generator.

13. The electrical power system of claim 11 wherein the secondary generator is a DC generator.

14. The electrical power system of claim 1 wherein the battery, motor, primary generator, and secondary generator are each directly connected to one non-conductive stand.

15. The electrical power system of claim 1 further comprising a cover enclosing the battery, motor, primary generator, and secondary generator.

16. The electrical power system of claim 11 wherein an AC electrical output from the primary generator is electrically connected to an electrical outlet panel comprising an electrical outlet.

17. The electrical power system of claim 16 further comprising a controller, the controller configured to direct an excess power at the electrical outlet panel to the battery.

18. The electrical power system of claim 17 further comprising an AC/DC converter along a flow path from the electrical outlet panel to the battery.

19. A method of generating power comprising:
activating a motor, the motor powered by a battery in electrical communication with the motor;
rotating a linear shaft formed of a conductive material extending outwardly from the motor by the motor, upon activation,
rotating a component of a primary generator, wherein the primary generator is an AC alternator, when the linear shaft rotates, the linear shaft engaged with the primary generator, the linear shaft passing through a central opening in the primary generator;
rotating a component of a secondary generator, wherein the secondary generator is a DC generator, when the linear shaft rotates, a distal end of the linear shaft engaged with the component of the secondary generator;
wherein an electrical output from the secondary generator is electrically connected to the battery, and wherein an electrical output from the primary generator is electrically connected to an electrical outlet panel comprising an electrical outlet; and
directing an electrical flow path through the shaft by an electrical connection of one of a negative terminal or a positive terminal of the battery to the motor, and an electrical connection of the other of the negative terminal or the positive terminal of the battery to a chassis of the secondary generator.

* * * * *